3,449,069
PURIFICATION OF PHOSPHATES
Daniel J. Brenzel, Menlo Park, Calif., assignor to FMC
  Corporation, New York, N.Y., a corporation of
  Delaware
No Drawing. Filed Mar. 8, 1966, Ser. No. 532,565
Int. Cl. C01b *25/28, 25/04*
U.S. Cl. 23—107                                      14 Claims

ABSTRACT OF THE DISCLOSURE

Treatment of condensed phosphates to remove heavy metal contaminants. In one embodiment, an aqueous solution of tetrapotassium pyrophosphate containing about 6 to 20 p.p.m. of Fe is made more alkaline by addition of KOH and an adsorbant (such as synthetic magnesium silicate) is added. The resulting solution has a greatly reduced heavy metal content.

---

This invention relates to the treatment of phosphate salts and relates more particularly to the purification of condensed phosphates.

The production of condensed phosphates, such as the pyro-, meta-, poly-, and ultraphosphates, is well known to the art. These compounds may be produced, for example, by molecularly dehydrating an acidic alkali metal orthophosphate as by heat treatment in a rotary kiln, spray tower or fluidized bed. The condensed orthophosphates are available commercially in various forms such as crystalline solids or concentrated aqueous solutions. These products often contain small and variable amounts of iron and copper owing, for example, to the use of raw materials containing these metals as impurities, or equipment having walls comprising these metals, in the manufacture of the condensed phosphates. Although the amount of iron or copper in the product is generally very small (e.g., well under 100 p.p.m., usually well below 30 p.p.m. typically about 6 to 20 p.p.m. of Fe and about 0.1 to 1 p.p.m. of Cu, based on the weight of the phosphate), the presence of these impurities, and the variations in their amounts, are undesirable for many purposes, such as for the use of the condensed phosphates as builders in detergent compositions.

It is therefore one object of this invention to provide a process for reducing the iron or copper content of condensed phosphates.

Another object of this invention is the provision of a novel process for controlling the iron and copper content of a condensed phosphate at a predetermined level.

Other objects of this invention will be apparent from the following detailed description and claims. In this description and claims all proportions are by weight unless other wise indicated.

In accordance with one aspect of this invention, an aqueous solution of a condensed phospate is treated to raise its pH to an extent sufficient to cause the separation of heavy metal from the dissolved condensed phosphate and the solution is maintained in contact with an adsorbant whereby the heavy metal content of the phosphate is reduced.

The invention has particular utility for the treament of alkali metal, especially sodium and potassium, salts of condensed phosphates. Specific examples of such materials are tetrapotassium pyrophosphate, tetrasodium pyrophosphate, sodium metaphosphate, sodium tripolyphosphate and potassium tripolyphosphate.

The concentration of the solution may vary widely, but it is generally preferable, in order to minimize any required subsequent removal of water, to use highly concentrated solutions, e.g., solutions close to the saturation point such as solutions whose condensed phosphate concentrations are at least about 75% and, preferably, at least about 90% of the saturation concentration.

The temperature of the solution being treated may also be varied. The solubility of the phosphate and the rate of adsorption of the metal impurity usually increase with increasing temperature and it is advantageous to use elevated temperatures, e.g., in the range of about 30° C. to about the boiling point of the solution, preferably about 50 to 80° C., most preferably about 40° C. to 70° C. It is convenient to operate at substantially atmospheric pressure but subatmospheric or superatmospheric pressures may be used.

The pH level to which the condensed phosphate solution is raised will depend on the particular phosphate being treated and the level of contamination which can be tolerated. For example, an aqueous 60% solution of tetrapotassium pyrophosphate normally has an inherent pH of about 11.1; raising the pH to values in the neighborhood of 12.5, 13.5 and almost 14, reduces the amounts of iron which can be held stably in solution to about 5 p.p.m, about 1 p.p.m. and 0.0 p.p.m., respectively, from an original value of 100 p.p.m. or more. It will be seen that by choosing the pH of the treatment one can predetermine and control the contaminant level in the final product in a relatively accurate manner. In general, the pH should be raised by above about ¼ pH unit, preferably at least about 1 pH unit, above the normal or inherent pH level of the solution. The rise in pH can be conveniently effected by the addition of minor amounts (based on the weight of the phosphate) of a strong base, preferably a base having the same cation as the phosphate being treated. Examples of suitable bases are KOH and NaOH. When the pH is raised, as indicated above, there is generally a noticeable change in the color of the solution, which takes on an orange hue in the absence of an adsorbent; the increase in pH reduces the sequestering power of the phosphate for the iron, causing the iron to be thrown out of solution and forming, we believe, a highly peptized colloid of iron hydroxide, which colloidal precipitate is so finely divided that it passes through the openings in conventional filters and filter aids. One suitable range of proportions of the base is about 0.5 to 5 volumes of an aqueous 50 weight percent sodium hydroxide solution per 100 volumes of the phosphate solution being treated. Best results are obtained when the amount of base added is insufficient to raise the pH to such an extent that substantial dissolution of the iron hydroxide occurs due to the amphoteric nature of the iron (e.g., ferric) ion.

The adsorbants suitable in the practice of this invention include such well known industrial adsorbants as magnesium or aluminum silicates (including aluminum magnesium silicate, e.g., fuller's earth, and silicas and aluminas of high surface area, such as diatomaceous earth or activated bauxite, as well as organic polymeric adsorbants such as dextrans (e.g., of molecular weight 20,000–100,000). Without being limited to any theory, it is believed that the adsorbing action is a physical one. Best results have thus far been obtained with the synthetic magnesium silicates, calcined magnesium oxides, attapulgus clays, and activated bauxites. These materials, which have a high surface to volume ratio, are generally present in their hydrated forms, containing hydroxyl groups, during the process.

For best results, the adsorbant is slurried into the phosphate solution prior to the addition of the base, and the adsorbant is maintained in contact with the base-treated solution for some time, e.g., for a period greater than 1 minute and preferably at least five minutes, e.g., 10 or 15 minutes to 2 or more hours, to insure complete adsorption of the colloidal precipitates formed on the addition of base. This can be accomplished in a very effective manner by adding the base to the adsorbant-containing phosphate solution gradually (e.g., over a period of more than a minute. preferably about 5 minutes or more). The adsorption is found to be most complete and rapid when the adsorbant is present at the time the heavy metal is thrown out of solution. The contact time required for optimum removal of the heavy metal impurity will depend on the temperature; for example, the adsorbant may be in contact with the base-treated solution for 10 minutes or more at 80° C., or for well over 20 minutes at 25° C.

The amount of adsorbant used may be varied, but for best results at least about 0.01% of adsorbant based on the weight of solution should be used. Proportions of adsorbant in the range of about 0.03 to 0.1% are preferred. The use of higher proportions, e.g., ½% or more, is within the scope of the invention.

The adsorbant may be removed from the treated solution in any suitable manner. Physical removal by filtration under pressure is a preferred technique. Gravity settling or centrifuging may also be used. The adsorbant may be used as a filter aid during filtration. Preferably, the removal of adsorbant carrying the heavy metal impurity, is effected at temperatures of about 20 to 70° C.

For many purposes, it is desirable to supply the treated condensed phosphates at a lower alkalinity than that prevailing during the treatment. To this end, the filtered solutions may be partially neutralized by means of any suitable acid, preferably with an acidic ion-exchange resin, pyrophosphoric acid or an acid pyrophosphate salt (e.g., $K_2H_2P_4O_7$ or $Na_2H_2P_4O_7$), or superphosphoric acid (e.g., an acid of high $P_2O_5$ content, comprising a mixture of pyrophosphoric and other condensed phosphoric acids together with orthophosphoric acid). The anion and cation of the acidic material are preferably chosen to minimize the introduction of extraneous ions into the purified salt solution; for example, the amount of orthophosphate ions introduced in the acid is preferably such that the orthophosphate content of the product is below about 10% preferably below about 5%, e.g., less than about 3%.

After removal of the adsorbant, the treated solution may be used as such or it may be dried in any suitable manner, as by spray-drying into a heated atmosphere, to produce a finely divided solid condensed phosphate of low iron or copper content.

The following examples are given to illustrate this invention further:

EXAMPLE I

Crystalline tetrapotassium pyrophosphate was dissolved in water to form a 65% solution. To 200 cc. of this solution there was added 0.18 gram of Celkate T–21 (a finely divided water insoluble synthetic magnesium silicate prepared hydrothermally from $Mg(OH)_2$ slurry and diatomaceous earth; the product having the chemical composition: 66% $SiO_2$; 16.6% MgO and 9.1% $H_2O$ plus minor constituents; having an average particle size of 2.6 microns, an oil adsorption of 170%, and a surface of 180 sq. meters/gram, to form a slurry, at a temperature of 55° C. Thereafter, the pH of the mixture was raised from 11.1 to over 13 by the addition of 4 cc. of an aqueous 48% solution of KOH over a 10 minute period, while agitating. The initially brown slurry became slightly darker. After 20 minutes of agitation, the mixture was then filtered hot and mixed with 1.5 cc. of 75% phosphoric acid to reduce its pH to 11.1. The treated solution contained 0.8 p.p.m. Fe and 0.00 p.p.m. Cu compared to 8 p.p.m. Fe and 3.16 p.p.m. Cu originally.

EXAMPLE II (a) To 400 cc. of an aqueous 55% tetrapotassium pyrophosphate solution at 60° C. there was added sufficient diatomaceous earth to make a 0.25% slurry of the earth. Then 4.3 cc. of an aqueous 48% solution of KOH were added and the mixture was agitated. After two hours, the still hot mixture was filtered to give a solution containing only 0.8 p.p.m. Fe, as compared to the 27.5 p.p.m. Fe in the starting solution. The diatomaceous earth used in this example is a well known material consisting of microscopic silica skeletons of diatoms of particle size ranging from less than 5 microns to 100 microns, composed mainly of $SiO_2$ with some minor constituents (Fe, Al, Ca).

(b) Example II(a) was repeated except that in place of the diatomaceous earth there was used Seasorb 43 grade of MgO, a lightly calcined MgO characterized by easy hydration to $Mg(OH)_2$, small particle size (average particle size 0.25 micron in diameter) and high iodine number (over 80). The resulting solution contained 0.0 p.p.m. Fe.

EXAMPLE III 0.34 gram of water-soluble dextran was dissolved in 30 grams of water at room temperature and added to 200 cc. of an aqueous 65% tetrapotassium pyrophosphate solution, maintained at 60° C., containing 11.5 p.p.m. Fe, forming a slurry containing filterable particles of dextran (the latter being "salted out" of solution because of the presence of the salt). Then 3 cc. of an aqueous 44% KOH solution was added, the mixture was agitated, and after two hours the mixture was filtered, at a temperature of 60° C., to give a solution containing 2.0 p.p.m. Fe.

EXAMPLE IV

An aqueous solution containing 11% tetrasodium pyrophosphate and 44% tetrapotassium pyrophosphate and 3.5 p.p.m. Fe was mixed with 0.06% of the magnesium silicate of Example I at 50° C., and then its pH was raised from 9.7 to 12.3 by the addition of an aqueous 48% KOH solution. After 30 minutes, the solution was filtered. The product contained 0.0 p.p.m. Fe.

EXAMPLE V

An aqueous solution containing 50% sodium metaphosphate and 15.5 p.p.m. Fe was mixed with 0.06% of the magnesium silicate of Example I at 50° C., and then its pH was raised from 5.8 to 10.6 by the addition of an aqueous 50% NaOH solution. After 30 minutes, the solution was filtered. The product contained 1.0 p.p.m. Fe.

EXAMPLE VI

An aqueous solution containing 15% of sodium tripolyphosphate and 6.0 p.p.m. Fe was mixed with 0.02% of the magnesium silicate of Example I at 40° C., and then its pH was raised from 11.26 to 11.56 by the addition of an aqueous 50% NaOH solution. After 30 minutes, the solution was filtered. The product contained 0.0 p.p.m. Fe.

EXAMPLE VII

An aqueous solution containing 10% of tetrasodium pyrophosphate and 3.8 p.p.m. Fe was mixed with 0.02% of the magnesium silicate of Example I at 50° C., and then its pH was raised from 9.9 to 11.10 by the addition of an aqueous 50% NaOH solution. After 30 minutes the solution was filtered. The product contained 0.0 p.p.m. Fe.

EXAMPLE VIII (a) An aqueous solution containing 60% potassium pyrophosphate and 3.5 p.p.m. Fe was preslurried with 0.058% −200 mesh attapulgas clay at 65° C. To the resulting slurry 1.6 volume percent of 50% potassium hydroxide was added raising the 1 weight percent pH from 10.3 to 10.95 (or from 11.1 to over 13 for the 60 weight percent solution). The slurry was agitated for thirty minutes and filtered; the resulting water white solution was neutralized to a 1 weight percent pH of 10.3 with 0.4 volume percent of superphosphoric acid solution of 70% $P_2O_5$ content. The resulting 60% potassium pyrophosphate solution contained 0.0 p.p.m. Fe and had a pH of 11.1 (60% solution basis).

(b) In the above example the 0.058 weight percent attapulgas clay was replaced by 0.058 weight percent —60 mesh activated bauxite. (Commercially known as Porocel marketed by Minerals and Chemicals Phillipp Corporation.) The final solution again analyzed 0.0 p.p.m. Fe.

In the foregoing examples, the base was added gradually over a ten minute period and the filtration was effected with a small amount of diatomaceous earth precoated on a fritted glass filter. When operating on a larger scale, it is advantageous to use a pressure leaf filter employing filter aid preslurry and precoat, the filter aid being for example Dicalite Speedplus, a medium speed diatomaceous earth.

The invention has found its greatest utility in the treatment of condensed phosphates which are already in relatively pure condition. The process of this invention makes it possible, however, to use raw materials containing high and variable quantities of heavy metals such as iron and copper, and to use process equipment from which the materials can pick up such heavy metals. Despite these sources of contamination, the final product can, by the use of this invention, be brought readily to a predetermined low heavy metal content, the exact level being easily regulated by control of the pH, as indicated above.

While the invention is most useful for the removal of iron and copper impurities from condensed phosphates of sodium and potassium, it is within the broader scope of the invention to use it for removing other heavy metals, such as Mn, Co, Ni, Zn and Cd, and for treatment of other condensed phosphates such as the condensed phosphates of Li, Rb, Cs, Fr and ammonium cations. It is also within the broader scope of the invention to use other bases, e.g., organic bases, $NH_3$, LiOH or RbOH.

It is to be understood that the foregoing detailed description is given merely by way of illustration and that many variations may be made therein without departing from the spirit of this invention.

I claim:

1. Process for the removal of iron or copper contaminant from a condensed phosphate salt whose iron or copper content is less than 100 p.p.m., which comprises providing an aqueous solution of said contaminated salt at a pH higher than the inherent pH of said solution and maintaining said solution at said higher pH in the presence of an adsorbant effective to remove said iron or copper, whereby to produce a liquid aqueous solution of said salt having a reduced content of said contaminant.

2. Process for the removal of iron or copper contaminant from a condensed phosphate salt whose iron or copper content is less than 100 p.p.m., which comprises reducing the sequestering power of said contaminated salt for said iron or copper in aqueous solution and thereby separating an iron- or copper-containing dispersed phase from an aqueous solution of said salt, in the presence of an adsorbant effective to remove said iron or copper and separating said adsorbant carrying said iron or copper from said solution.

3. Process as set forth in claim 1 in which the contaminant comprises iron in amount of up to about 100 p.p.m. based on the weight of said salt.

4. Process as set forth in claim 1 in which the concentration of said salt is at least about 75% of the saturation concentration of said salt.

5. Process as set forth in claim 1 and including the step of adding a base to raise the pH of the solution by at least about ¼ pH unit above said inherent pH.

6. Process as set forth in claim 5 in which said adsorbant is present in finely divided form in the aqueous solution of said salt during the addition of said base and is removed from said solution after said addition.

7. Process as set forth in claim 6 in which the base is added, in amount sufficient to raise the pH of the solution by at least about ½ unit, to a mixture consisting essentially of the water, the condensed phosphate, and at least about 0.01%, based on the weight of solution, of said adsorbant.

8. Process as set forth in claim 5 in which the condensed phosphate comprises tetrapotassium pyrophosphate containing iron as an impurity in amount of up to about 100 p.p.m., and the adsorbant is removed by filtration.

9. Process as set forth in claim 8 in which the condensed phosphate is present in concentration of at least about 75% of its saturation concentration and the adsorbant is added in amount of at least about 0.01%, based on the weight of the solution, prior to the addition of said base, the temperature of the base-treated adsorbant-containing solution being maintained at about 30–80° C. for at least about 10 minutes, said base being sodium hydroxide or potassium hydroxide.

10. Process as set forth in claim 9 in which said base is added gradually, over a period of more than a minute, to the adsorbant-containing solution.

11. Process as set forth in claim 5 in which the adsorbant is substantially insoluble in, and inert to, the solution of condensed phosphate salt and comprises magnesia, a magnesium silicate, or alumina.

12. Process as set forth in claim 10 in which said adsorbant is a synthetic magnesium silicate, a caustic calcined magnesium oxide, an attapulgus clay, or an activated bauxite.

13. Process as set forth in claim 1 in which the contaminant comprises copper in amount below 100 p.p.m. based on the weight of the salt.

14. Process as in claim 1 and including the subsequent step of physically separating the adsorbant from said liquid solution of reduced contaminant content.

References Cited

UNITED STATES PATENTS 3,035,898  5/1962  Baumann _____ 23—107

OSCAR R. VERTIZ, *Primary Examiner.*

L. A. MARSH, *Assistant Examiner.*